(12) United States Patent
Lewis et al.

(10) Patent No.: US 7,054,153 B2
(45) Date of Patent: May 30, 2006

(54) MOUNT FOR COMPUTER DRIVE

(75) Inventors: Jeffrey M. Lewis, Maynard, MA (US); Michael P. Rolla, Maynard, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 50 days.

(21) Appl. No.: 10/698,560

(22) Filed: Oct. 31, 2003

(65) Prior Publication Data

US 2005/0094366 A1 May 5, 2005

(51) Int. Cl.
*G06F 1/16* (2006.01)

(52) U.S. Cl. .................. 361/685; 361/801; 360/97.01; 439/153

(58) Field of Classification Search ........ 361/679–687, 361/724–727, 800–801; 312/223.2, 244; 439/152–153; 362/294; 360/97.01, 98.01
See application file for complete search history.

(56) References Cited

U.S. PATENT DOCUMENTS

| | | | |
|---|---|---|---|
| 4,705,257 A | 11/1987 | Leo et al. | |
| 4,896,777 A | 1/1990 | Lewis | |
| 4,979,909 A | 12/1990 | Andrews | |
| 5,128,830 A | 7/1992 | Deluca et al. | |
| D332,256 S | 1/1993 | Lewis | |
| 5,332,306 A | 7/1994 | Babb et al. | |
| 5,333,097 A | 7/1994 | Christensen et al. | |
| 5,340,340 A | 8/1994 | Hastings et al. | |
| 5,481,431 A * | 1/1996 | Siahpolo et al. ............ 361/685 |
| 5,575,529 A | 11/1996 | Dowdy et al. | |
| 5,587,879 A * | 12/1996 | Spano et al. ................ 361/685 |
| 5,668,697 A | 9/1997 | Dowdy | |
| 5,673,171 A | 9/1997 | Varghese et al. | |
| RE35,915 E | 10/1998 | Hastings et al. | |
| 5,858,509 A | 1/1999 | Polch et al. | |
| 6,052,278 A | 4/2000 | Tanzer et al. | |
| 6,061,202 A | 5/2000 | Bloom et al. | |
| 6,064,567 A | 5/2000 | Cheng | |
| 6,088,221 A | 7/2000 | Bolognia | |
| 6,160,703 A | 12/2000 | Lopez | |
| 6,247,944 B1 | 6/2001 | Bolognia et al. | |
| 6,285,545 B1 | 9/2001 | Lopez | |
| 6,302,714 B1 | 10/2001 | Bolognia et al. | |
| 6,317,319 B1 | 11/2001 | Lewis et al. | |
| 6,366,457 B1 * | 4/2002 | Otto et al. .................. 361/685 |
| D458,924 S | 6/2002 | Tsuyuki et al. | |
| 6,462,940 B1 | 10/2002 | Diaz et al. | |
| 6,501,210 B1 | 12/2002 | Ueno | |
| 6,625,014 B1 | 9/2003 | Tucker et al. | |
| 6,819,555 B1 * | 11/2004 | Bolognia et al. ........... 361/685 |
| 6,876,547 B1 * | 4/2005 | McAlister ................... 361/685 |

OTHER PUBLICATIONS

U.S. Appl. No. 10/647,915, filed Aug. 26, 2003 "Drive Loading System" Arlen L. Roesner.

* cited by examiner

*Primary Examiner*—Hung Van Duong (57) ABSTRACT

A mount for a computer drive. The mount has a base structure having a plurality of lateral retainers and a top structure mountable to the base structure over a drive region. The top structure also has an arcuate drive interface extendable into the drive region.

53 Claims, 6 Drawing Sheets

MOUNT FOR COMPUTER DRIVE

BACKGROUND

Servers and other computer systems generally have a plurality of computer drives and modular components, such as hard disk drives. In certain systems, such as rack mount servers, serviceability and cooling are particularly important for continued operation. Unfortunately, existing mounting schemes for modular components, such as hard disk drives, are not configured for easy access and removal of the modular components. Moreover, many existing mounting schemes, such as mounting foam or rubber grommets, consume considerable space. In many systems, space is unavailable for such space-consuming mounting schemes.

BRIEF DESCRIPTION OF THE DRAWINGS

Advantages of one or more disclosed embodiments will become apparent upon reading the following detailed description and upon reference to the drawings in which.

DETAILED DESCRIPTION

Figure 1:
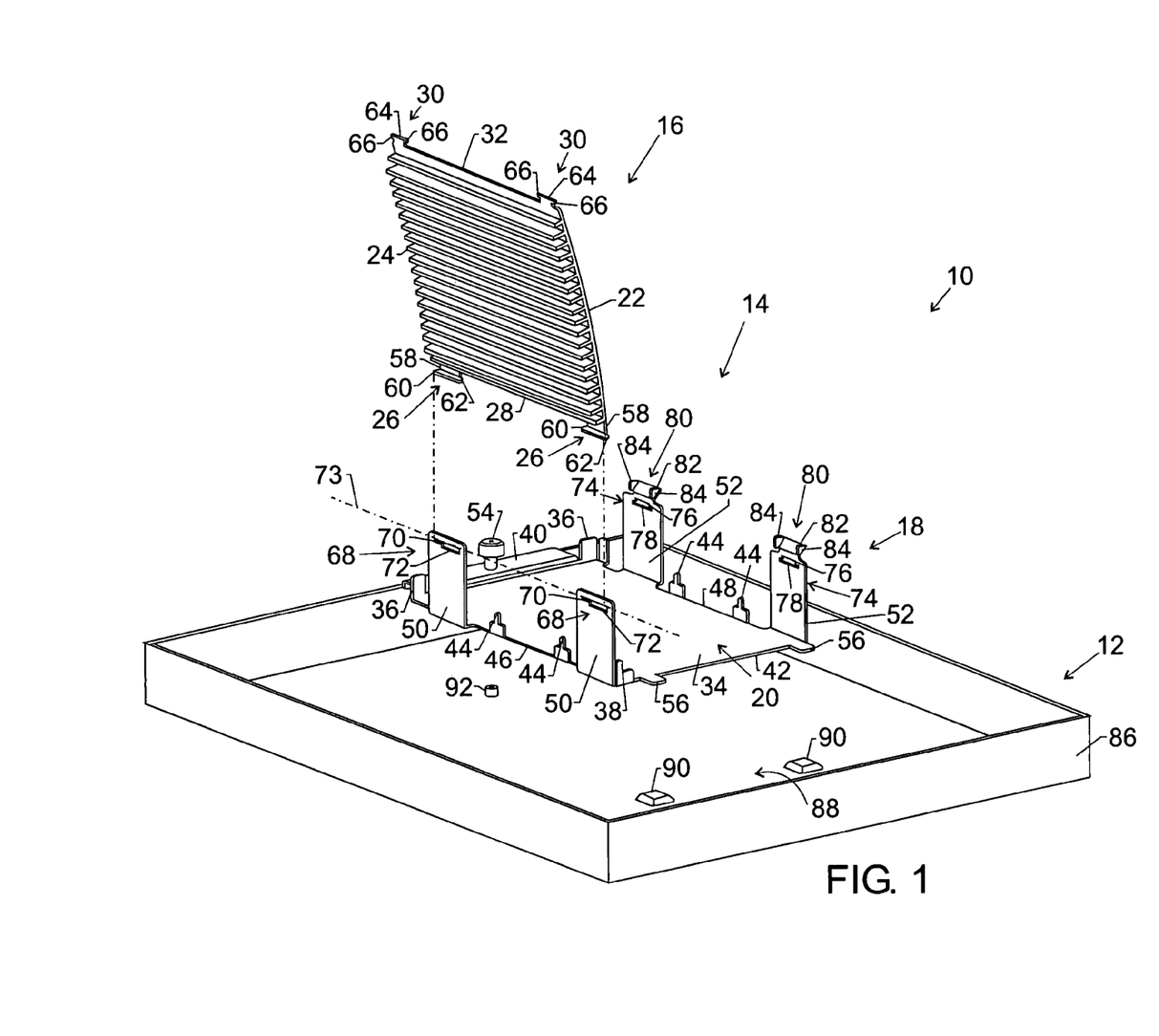
FIG. 1 is an exploded perspective view of a processor-based system having a chassis and a compressive drive mount in accordance with certain embodiments of the present invention.

FIG. 1 is an exploded perspective view of a processor-based system 10 having a chassis 12 and a compressive drive mount 14 in accordance with certain embodiments of the present invention. The processor-based system 10 may comprise any suitable circuitry and devices, such as a motherboard, a central processing unit, one or more cooling devices or fans, one or more hard disk drives or other storage devices, one or more random access memory (RAM) modules, audio circuitry, video circuitry, network circuitry, security circuitry, and other computer components. Moreover, the chassis 12 may comprise a desktop computer chassis, a portable computer chassis, a server chassis, a rack mount chassis (e.g., a rack mount server), or other desired chassis.

The compressive drive mount 14 comprises a top bracket or mount structure 16 and a base bracket or mount structure 18, which is mountable to the chassis 12. In operation, as discussed in further detail below, the top mount structure 16 and the base mount structure 18 are coupled together about a drive mounting region 20, such that a computer drive or modular component can be removably secured to the chassis 12. For example, the base mount structure 18 may provide lateral retention of the modular component, while the top mount structure 16 provides vertical retention of the computer drive or modular component. As illustrated, the vertical retention provided by the top mount structure 16 comprises a compressive force, which securely holds the computer drive or modular component between the top and base mount structures 16 and 18. This compressive force also can substantially dampen vibrations of the computer drive or modular component.

In the illustrated embodiment of FIG. 1, the top mount structure 16 comprises a resilient curved portion or arcuate drive interface 22, a plurality of upper heat sink members or heat transfer structures 24 extending from the arcuate drive interface 22, a pair of pivot structures 26 disposed on a side 28 of the top mount structure 16, and a pair of latch structures 30 disposed on a side 32 of the top mount structure 16. The base mount structure 18 comprises a plurality of lateral retainers projecting from a base portion 34. As illustrated, the lateral retainers comprise outer retainers or rough alignment tabs 36 and 38 disposed on front and rear sides 40 and 42 of the base portion 34, base retainers or locating tabs 44 disposed on opposite sides 46 and 48 of the base portion 34, and side retainers or mounting legs 50 and 52 disposed on opposite sides 46 and 48, respectively. Other embodiments of the base mount structure 18 may comprise other suitable lateral retention mechanisms to restrict lateral movement of a computer drive or modular component. The illustrated base mount structure 18 also comprises tool-free mounting mechanisms for coupling the compressive drive mount 14 to the chassis 12. In the illustrated embodiment, these tool-free mounting mechanisms comprise a hand-engageable threaded fastener 54 and chassis mounting tabs 56 disposed on the front and rear sides 40 and 42, respectively.

Turning to the top mount structure 16, the arcuate drive interface 22 may comprise any suitable curved geometry, such as a substantially cylindrical or convex geometry. In operation, the arcuate drive interface 22 extends inwardly into the drive mounting region 20 during assembly of the top and base mount structure 16 and 18. As a result, the arcuate drive interface 22 contacts and creates a biasing force against a computer drive or modular component when disposed in the drive mounting region 20, resistively and resiliently bends in a direction opposite the curvature of the arcuate drive interface 22, and removably couples to the base mount structure in a vertical retention position over the computer drive or modular component. This biasing force creates a compressive mounting force between the top and base mount structures 16 and 18.

The heat transfer structures 24 extending from the arcuate drive interface 22 facilitate heat transfer away from a computer drive or modular component disposed within the drive mounting region 20. These heat transfer structures 24 may comprise any suitable materials and structures, e.g., protruding pins, prongs, or fins. The pressure biased contact between the arcuate drive interface 22 and the computer drive or modular component further promotes heat transfer by providing a substantially continuous conductive path to the heat transfer structures 24. Some embodiments of the compressive drive mount 14 further comprise a thermal contact interface material disposed between the arcuate drive interface 22 and a computer drive or modular component disposed in the drive mounting region 20. A fan also may be disposed adjacent the heat transfer structures 24 to facilitate convective heat transfer away from the heat transfer structures 24.

The pivot structures 26 and latch structures 30 disposed on the top mount structure 16 provide a tool-free mechanism for removably coupling the top mount structure 16 to the base mount structure 18. As illustrated, the pivot structures 26 comprise a hook or L-shaped structure having a tab portion 58 and a lip portion 60. The illustrated tab portion 58 is substantially aligned with the arcuate drive interface 22, while the lip portion 60 extends angularly outward from the tab portion 58 (e.g., perpendicular). In addition, the illustrated lip portion 60 comprises an outer hook portion 62. On the opposite side 32 of the top mount structure 16, the illustrated latch structures 30 comprise latching tab portions 64 substantially aligned with the arcuate drive interface 22. In the illustrated embodiment, the latching tab portions 64 comprise a T-shaped structure having outer hook portions 66. Other embodiments of the pivot structures 26 and latch structures 30 may comprise any suitable hinging and/or latching mechanisms to facilitate removable attachment of the top mount structure 16 with the base of structure 18.

Turning to the base mount structure 18, the side retainers or mounting legs 50 and 52 comprise mating mechanisms for coupling with the pivot structures 26 and the latch structures 30 of the top mount structure 16, respectively. On the side 46 of the base mount structure 18, the illustrated side retainers or mounting legs 50 comprise pivot receptacles 68 having upper and lower slot portions 70 and 72. The upper slot portions 70 are sized relatively wider than the lower slot portions 72. In operation, as discussed in further detail below, the lip portions 60 of the pivot structures 26 can be received into the upper slot portions 70 of the pivot receptacles 68. Once received in the upper slot portions 70, the tab portions 58 of the pivot structures 26 slide into the lower slot portions 72 of the pivot receptacles 68. In the lower slot portions 72, the outer portions 62 of the pivot structures 26 function to retain the pivot structures 26 rotatably within the receptacles 68. Accordingly, after assembly of the pivot structures 26 and pivot receptacles 68, the top mount structure 16 can rotate about an axis 73 downwardly onto the base mount structure 18 toward the side retainers or mounting legs 52.

On the opposite side 48 of the base mount structure 18, the illustrated side retainers or mounting legs 52 comprise latch receptacles 74 having upper and lower slot portions 76 and 78. As illustrated, the upper slot portions 76 are sized relatively narrower than the lower slot portions 78. Above these latch receptacles 74, the side retainers or mounting legs 52 also may comprise latching guides 80 having an angled lead or ramp structure 82 surrounded by outer tabs or ears 84. In operation, as discussed in further detail below, the latching guides 80 lead the latch structures 30 of the top mount structure 16 downwardly into the latch receptacles 74. As the latching structures 30 slide angularly down the angled lead or ramp 82, the side retainers or mounting legs 52 bend resiliently outward from the drive mounting region 20. Upon reaching the relatively larger lower slot portions 78, the latch structures 30 slide into the latch receptacles 74 and the side retainers or mounting legs 52 return to their original unbent configuration. The latch structures 30 then slide up through the latch receptacles 74 from the larger lower slot portions 78 into the relatively narrow upper slot portions 76. In the upper slot portions 76, the outer hook portions 66 of the latch structures 30 extend beyond the width of the upper slot portions 76 to retain the latch structures 30 removably within the latch receptacles 74. The latch structures 30 can be detached from the latch receptacles 74 by pressing the latch structures 30 downwardly into the larger lower slot portions 78 and subsequently pushing the latching guides 80 outwardly from the drive mounting region 20.

Figure 2:
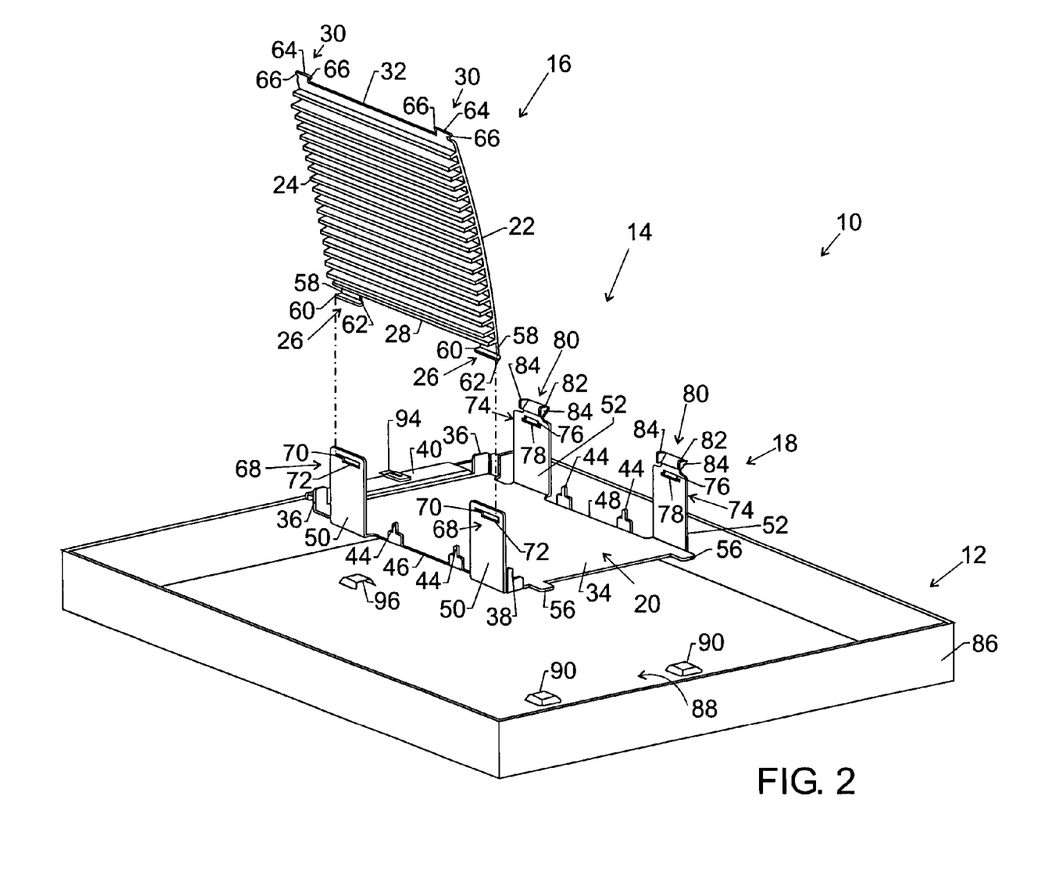
FIG. 2 is an exploded perspective view of the processor-based system of FIG. 1, illustrating an alternate compressive drive mount in accordance with other embodiments of the present invention.
Figure 3:
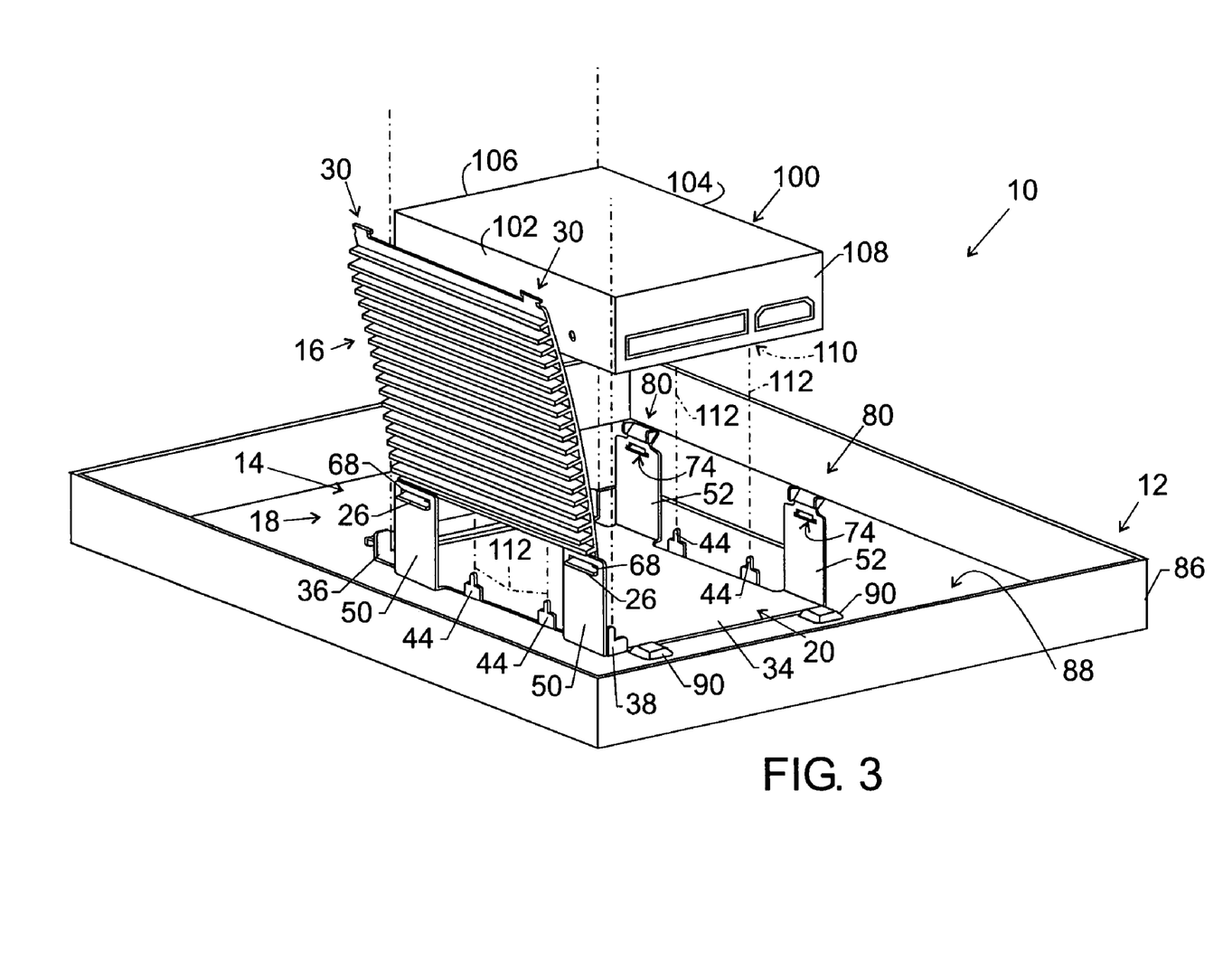
FIG. 3 is a perspective view illustrating a compressive drive mount removably coupled to a chassis and receiving a computer drive in accordance with embodiments of the present invention.

Regarding mounting of the base mount structure 18, the chassis 12 comprises outer walls 86 extending around an interior base portion 88, which has a pair of slots or latch receptacles 90 and a threaded fastener 92. In illustrated embodiment of FIG. 1, the base mount structure 18 is removably mounted to the chassis 12 by inserting the chassis mounting tabs 56 into the slots or latching receptacles 90 followed by engaging the hand-engageable threaded fastener 54 with the threaded fastener 92. Alternatively, in the illustrated embodiment of FIG. 2, the base mount structure 18 is removably mounted to the chassis 12 by inserting the chassis mounting tabs 56 into the slots or latching receptacles 90 followed by sliding a latching tab mechanism 94 removably into a slot or latching receptacle 96. Accordingly, the latching tab mechanism 94 may comprise a movable latch to move a tab in and out of the slot or latching receptacle 96. Alternatively, the base mount structure 18 may be bowable to facilitate engagement of the latching tab mechanism 94 in and out of the slot or latching receptacle 96. However, other suitable tool-free mounting mechanisms can be used to couple the base mount structure 18 to the chassis 12, as illustrated in FIG. 3. Alternatively, the base mount structure 18 may be fixedly coupled to the chassis 12, as illustrated in FIG. 4.

FIG. 3 is a perspective view illustrating an embodiment of a compressive drive mount removably coupled to the chassis 12 and in the process of receiving a computer drive or modular component 100. The computer drive or modular component 100 may comprise a variety of computer components, such as a processor package or a hard disk drive or other storage device. As illustrated, the top mount structure 16 is rotatably coupled to the side retainers or mounting legs 50 via engagement of the pivot structures 26 within the pivot receptacles 68, as described in detail above. The illustrated computer drive or modular component 100 is aligned for engagement with the base mount structure 18 via outer retainers or rough alignment tabs 36 and 38, base retainers or locating tabs 44, and side retainers or mounting legs 50 and 52. In the illustrated embodiment, opposite lateral sides 102 and 104 of the modular component 100 are aligned with the side retainers or mounting legs 50 and 52, while front and rear sides 106 and 108 are aligned with the outer retainers or rough alignment tabs 36 and 38. Together, these elements 36, 38, 50, and 52 of the base mount structure 18 guide the modular component 100 downwardly into the drive mounting region 20. As the modular component 100 reaches the base portion 34 of the base mount structure 18, the base retainers or locating tabs 44 enter mating receptacles 110 disposed within the modular component 100, as indicated by alignment lines 112. Once engaged, the base retainers or locating tabs 44 function to retain the computer drive or modular component 100 in the desired orientation within the drive mounting region 20.

Figure 4:
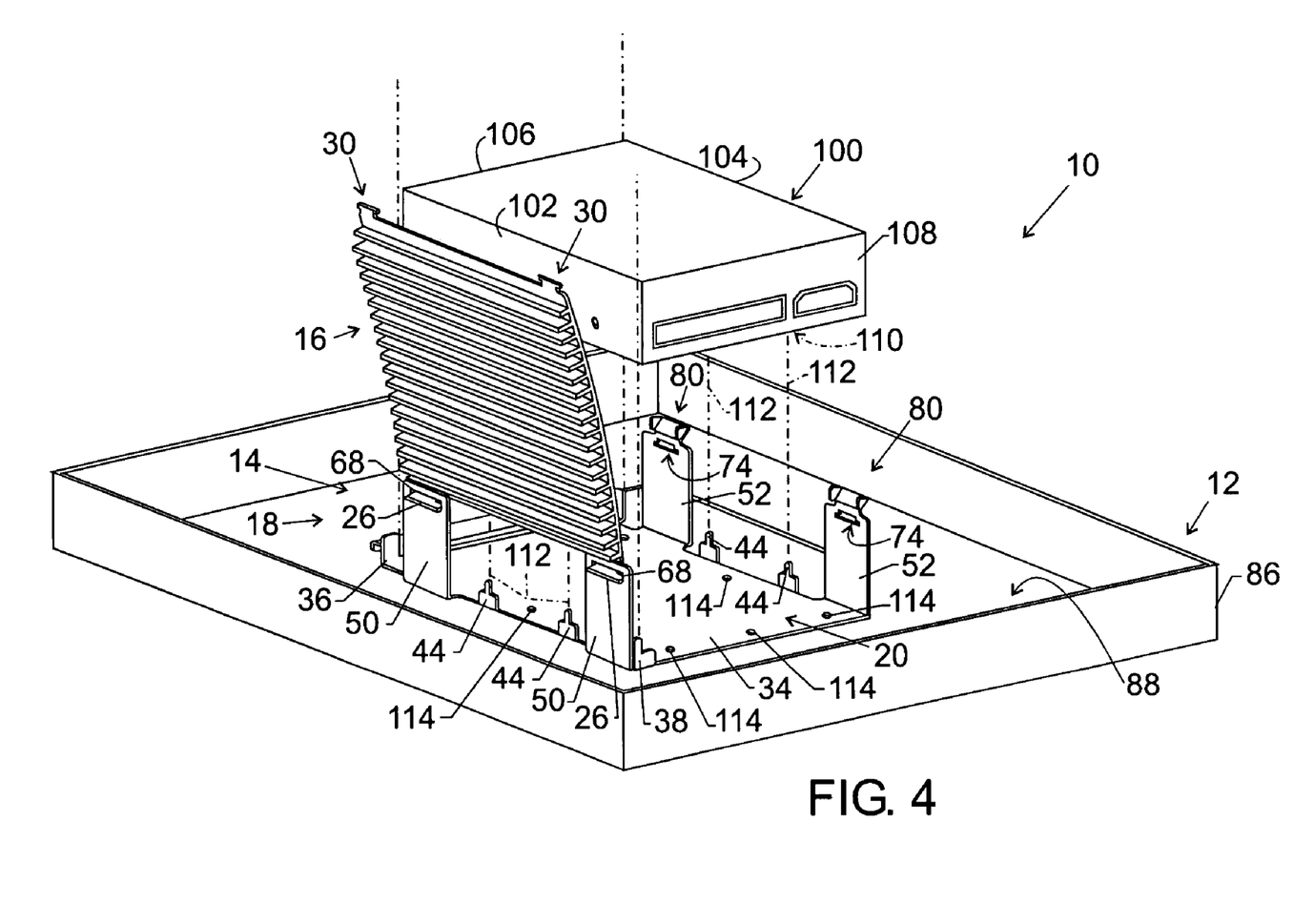
FIG. 4 is a perspective view illustrating an alternative compressive drive mount fixedly coupled to a chassis and receiving a computer drive in accordance with other embodiments of the present invention.

FIG. 4 is a perspective view illustrating an alternative compressive drive mount 14 fixedly coupled to the chassis 12 and in the process of receiving the computer drive 100 in accordance with other embodiments of the present invention. In this illustrated embodiment, the base mount structure 18 is fixedly coupled to the chassis 12 at fixed joints 114.

These fixed joints 114 may comprise rivets, spot welds, tool-engaged fasteners, or other suitable fixed fastening mechanism.

Figure 5:
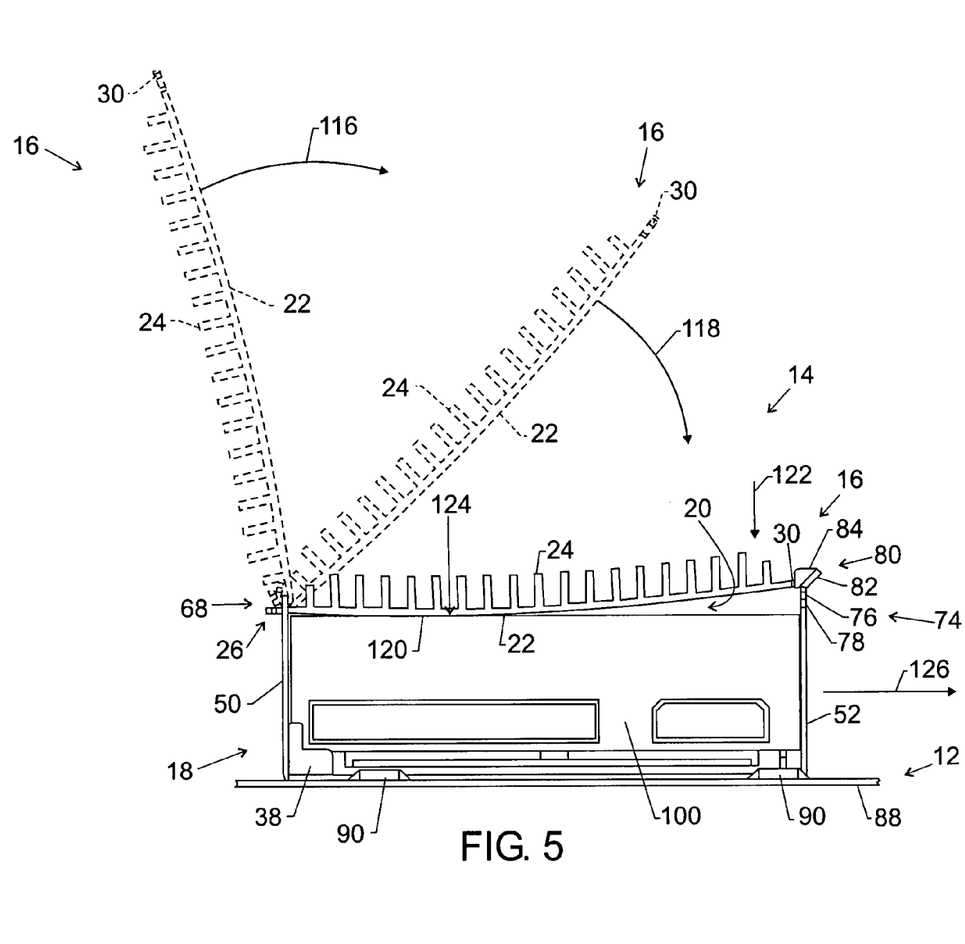
FIG. 5 is a side view of a compressive drive mount illustrating a top mount structure closing on a bottom mount structure about a computer drive in accordance with embodiments of the present invention.

FIG. 5 is a side view of the compressive drive mount 14, illustrating the top mount structure 16 in the process of closing on the bottom mount structure 18 about a computer drive or module component 100 in accordance with embodiments of the present invention. As discussed above, the top mount structure 16 rotates about the mounting legs 50 at the engagement of the pivot structures 26 with the pivot receptacles 68. As indicated by arrows 116 and 118, the top mount structure 16 is rotated downwardly onto the computer drive or modular component 100 until the arcuate drive interface 22 contacts an upper surface 120 of the modular component 100. From this contacting position, a force 122 is applied to the top mount structure 16 adjacent the latch structures 30.

As a result of this force 122, the arcuate drive interface 22 resistively and resiliently bends in a direction opposite its curvature, such that an increasingly stronger biasing force 124 is applied to the top surface 120 of the modular component 100. Simultaneously, the latch structures 30 of the top mount structure 16 engage the latching guides 80, slide angularly along the angled leads or ramps 82 forcing the mounting legs 52 to bend outward as indicated by arrow 126, slide into the lower slot portions 78 enabling the mounting legs 52 to return to an unbent configuration, and slide upwardly along the latch receptacles 74 into the upper slot portions 76. In the upper slot portions 76, the latch structures 30 are removably secured within the latch receptacles 74. Moreover, the modular component 100 is compressively secured between the top and base mount structure 16 and 18.

Figure 6:
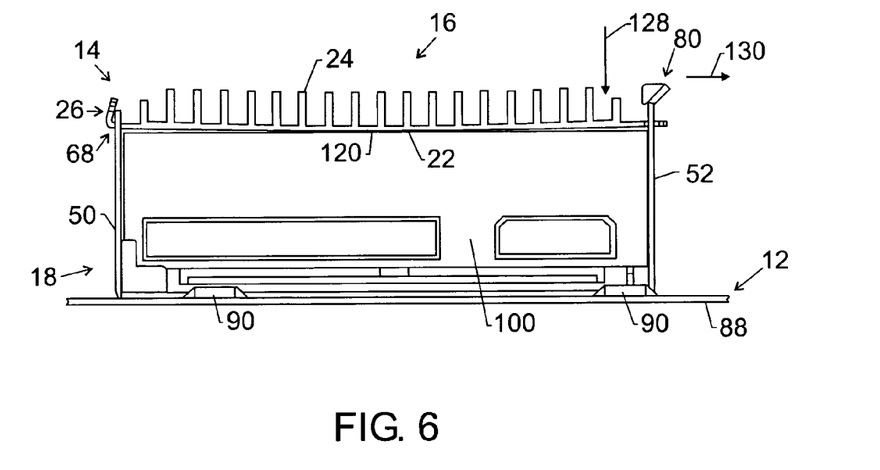
FIG. 6 is a side view of a compressive drive mount illustrating the top mount structure compressed onto a computer drive in accordance with embodiments of the present invention.
Figure 7:
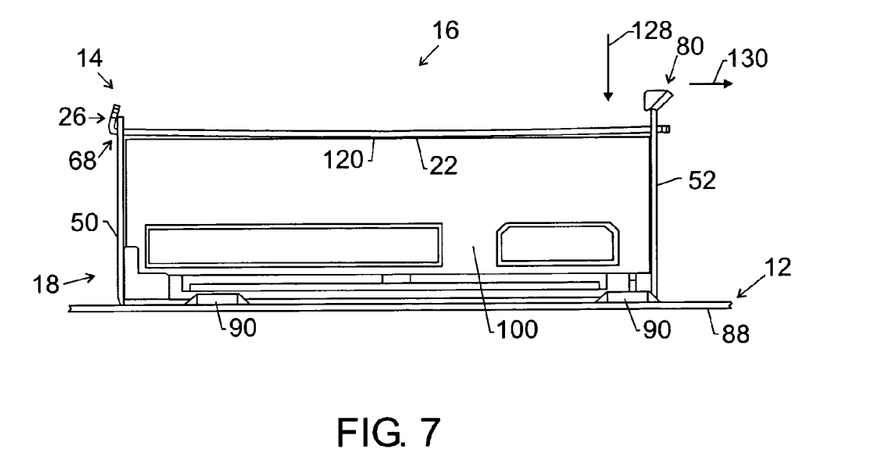
FIG. 7 is a side view of a compressive drive mount illustrating an alternative top mount structure compressed onto a computer drive in accordance with other embodiments of the present invention.

FIG. 6 is a side view of the compressive drive mount 14 illustrating the top mount structure 16 compressed or generally biased onto a computer drive or modular component 100 in accordance with embodiments of the present invention. In this illustrated embodiment, the heat transfer structures 24 facilitate heat transfer away from the computer drive or modular component 100. However, other embodiments of the compressive drive mount 14 may eliminate the heat transfer structures 24, as illustrated in the alternative embodiment of FIG. 7. For example, if space is limited within the chassis 12, then the heat transfer structures 24 may be eliminated or modified to provide additional space for mounting the modular component 100. Regardless of the inclusion or exclusion of heat transfer structures 24, the embodiments illustrated in FIGS. 6 and 7 can be dismounted by depressing the top mount structure 16 and laterally moving the mounting legs 52, as indicated by arrows 128 and 130.

What is claimed is:

1. A mount for a computer drive, comprising:
   a base structure having a plurality of lateral retainers; and
   a top structure mountable to the base structure over a drive region, wherein the top structure comprises an arcuate drive interface extendable into the drive region, and wherein the top structure comprises a plurality of heat transfer structures.

2. The mount set forth in claim 1, wherein the arcuate drive interface is adapted to provide a compressive mounting force between the base structure and the top structure.

3. The mount set forth in claim 1, wherein the arcuate drive interface comprises a substantially cylindrical surface.

4. The mount set forth in claim 1, wherein the top structure comprises a pivot structure that is pivotally mountable to the base structure.

5. The mount set forth in claim 1, wherein the top structure comprises a latch structure that is latchingly mountable to the base structure.

6. The mount set forth in claim 1, wherein the plurality of lateral retainers comprise a base retainer adapted to extend into an opening on the computer drive.

7. The mount set forth in claim 1, wherein the base structure comprises a tool-free chassis mounting mechanism.

8. The mount set forth in claim 7, wherein the tool-free chassis mounting mechanism comprises a hand-engageable latching fastener.

9. The mount set forth in claim 7, wherein the tool-free chassis mounting mechanism comprises a hand-engageable threading fastener.

10. A system, comprising:
    a chassis;
    a computer drive; and
    a bendable arcuate mount disposed within the chassis adjacent the computer drive, wherein the bendable arcuate mount comprises a plurality of heat transfer structures.

11. The system set forth in claim 10, wherein the chassis comprises a computer server.

12. The system set forth in claim 10, wherein the chassis comprises a desktop computer.

13. The system set forth in claim 10, wherein the computer drive comprises a hard disk drive.

14. The system set forth in claim 10, wherein the bendable arcuate mount comprises a hand-engageable fastening mechanism.

15. The system set forth in claim 10, wherein the bendable arcuate mount comprises a base bracket and a top latching bracket having a convex surface forcibly bendable against the computer drive disposed between the base bracket and the top latching bracket.

16. The system set forth in claim 14, wherein the hand-engageable fastening mechanism comprises a threaded fastener.

17. The system set forth in claim 14, wherein the hand-engageable fastening mechanism comprises a latchable fastener.

18. A mount for a computer drive, comprising:
    means for laterally retaining the computer drive in a chassis;
    means for bendingly compressing toward the computer drive to retain the computer drive vertically in the chassis; and
    means for transferring heat from the computer drive.

19. The mount set forth in claim 18, wherein the means for transferring heat comprises means for transferring heat from the computer drive along the means for bendingly compressing.

20. A method for mounting a computer drive, comprising:
    positioning the computer drive in a base mount structure within a chassis; and
    securing the computer drive between the base mount structure and a top mount structure having a bendable arcuate drive interface; and wherein securing comprises contacting a plurality of heat transfer structures.

21. The method set forth in claim 20, wherein positioning comprises laterally retaining the computer drive.

22. The method set forth in claim 20, wherein securing comprises forcing the bendable arcuate drive interface inwardly toward the base mount structure.

23. The method set forth in claim 20, wherein securing comprises coupling the top mount structure to the base mount structure with a hand-engageable fastener.

24. The method set forth in claim 20, comprising coupling the base mount structure to the chassis with a hand-engageable fastener.

25. The method set forth in claim 20, wherein the top mount structure comprises the plurality of heat transfer structures.

26. The method set forth in claim 22, wherein forcing comprises compressing the computer drive between the top and bottom mount structures.

27. A mount for a computer drive, comprising:
a base structure having a plurality of lateral retainers; and
a top structure mountable to the base structure over a drive region, wherein the top structure comprises an arcuate drive interface extendable into the drive region; and wherein the top structure comprises a pivot structure that is pivotally mountable to the base structure.

28. The mount set forth in claim 27, wherein the arcuate drive interface is adapted to provide a compressive mounting force between the base structure and the top structure.

29. The mount set forth in claim 27, wherein the arcuate drive interface comprises a substantially cylindrical surface.

30. The mount set forth in claim 27, wherein the top structure comprises a plurality of heat transfer structures.

31. The mount set forth in claim 27, wherein the top structure comprises a latch structure that is latchingly mountable to the base structure.

32. The mount set forth in claim 27, wherein the plurality of lateral retainers comprise a base retainer adapted to extend into an opening on the computer drive.

33. The mount set forth in claim 27, wherein the base structure comprises a tool-free chassis mounting mechanism.

34. The mount set forth in claim 33, wherein the tool-free chassis mounting mechanism comprises a hand-engageable latching fastener.

35. The mount set forth in claim 33, wherein the tool-free chassis mounting mechanism comprises a hand-engageable threading fastener.

36. A system, comprising:
a chassis;
a computer drive;
a bendable arcuate mount disposed within the chassis adjacent the computer drive; and wherein the bendable arcuate mount comprises a pivot structure that is pivotally mountable to a base structure.

37. The system set forth in claim 36, wherein the chassis comprises a computer server.

38. The system set forth in claim 36, wherein the chassis comprises a desktop computer.

39. The system set forth in claim 36, wherein the computer drive comprises a hard disk drive.

40. The system set forth in claim 36, wherein the bendable arcuate mount comprises a hand-engageable fastening mechanism.

41. The system set forth in claim 36, wherein the bendable arcuate mount comprises a top latching structure having a convex surface forcibly bendable against the computer drive disposed between the base structure and the top latching structure.

42. The system set forth in claim 36, wherein the bendable arcuate mount comprises a plurality of heat transfer structures.

43. The system set forth in claim 40, wherein the hand-engageable fastening mechanism comprises a threaded fastener.

44. The system set forth in claim 40, wherein the hand-engageable fastening mechanism comprises a latchable fastener.

45. A mount for a computer drive, comprising:
means for laterally retaining the computer drive in a chassis;
means for bendingly compressing against the computer drive to retain the computer drive vertically in the chassis; and
means for pivoting the means for bendingly compressing between open and closed positions relative to the means for laterally retaining.

46. The mount set forth in claim 45, comprising means for transferring heat from the computer drive.

47. A method for mounting a computer drive, comprising:
positioning the computer drive in a base mount structure within a chassis; and
securing the computer drive between the base mount structure and a top mount structure having a bendable arcuate drive interface; and wherein the top mount structure comprises a pivot structure that is pivotally mountable to the base mount structure.

48. The method set forth in claim 47, wherein positioning comprises laterally retaining the computer drive.

49. The method set forth in claim 47, wherein securing comprises forcing the bendable arcuate drive interface inwardly toward the base mount structure.

50. The method set forth in claim 47, wherein securing comprises coupling the top mount structure to the base mount structure with a hand-engageable fastener.

51. The method set forth in claim 47, comprising coupling the base mount structure to the chassis with a hand-engageable fastener.

52. The method set forth in claim 47, wherein securing comprises contacting a plurality of heat transfer structures.

53. The method set forth in claim 49, wherein forcing comprises compressing the computer drive between the top and bottom mount structures.

* * * * *